Jan. 2, 1968        L. J. ALBRECHT        3,361,962
METAL DETECTOR WITH ADJUSTABLE FRAME ASSEMBLY
Original Filed Feb. 18, 1965        2 Sheets-Sheet 1
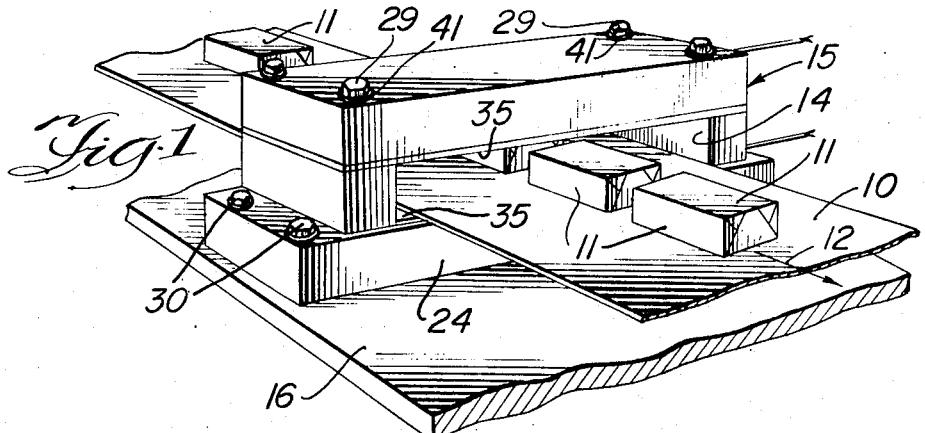
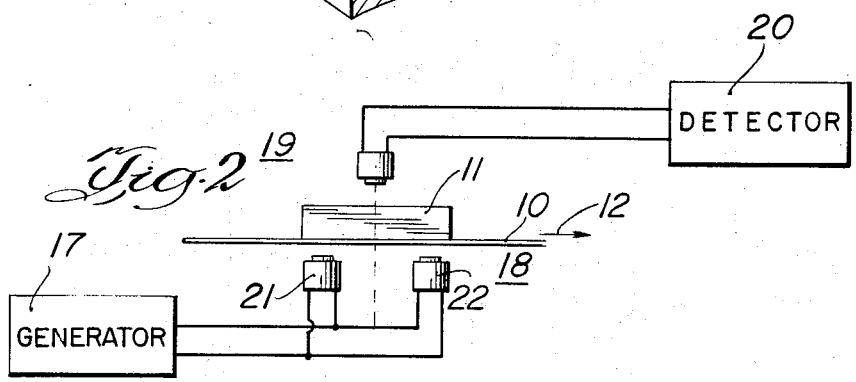
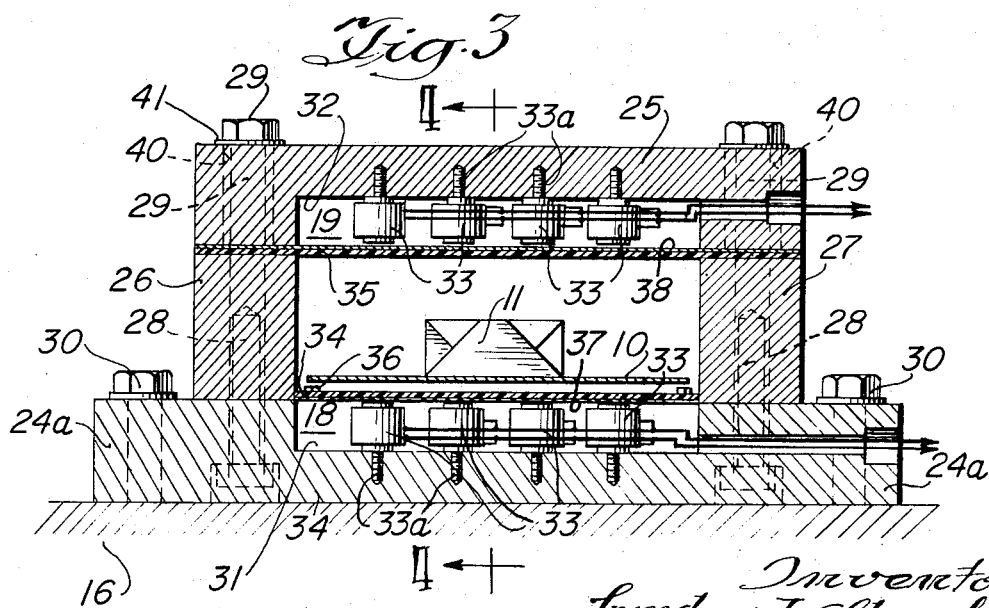
Inventor
Lyndon J. Albrecht
By Hofgren, Wegner, Allen, Stellman & McCord
Attorneys Jan. 2, 1968  L. J. ALBRECHT  3,361,962
METAL DETECTOR WITH ADJUSTABLE FRAME ASSEMBLY
Original Filed Feb. 18, 1965  2 Sheets-Sheet 2
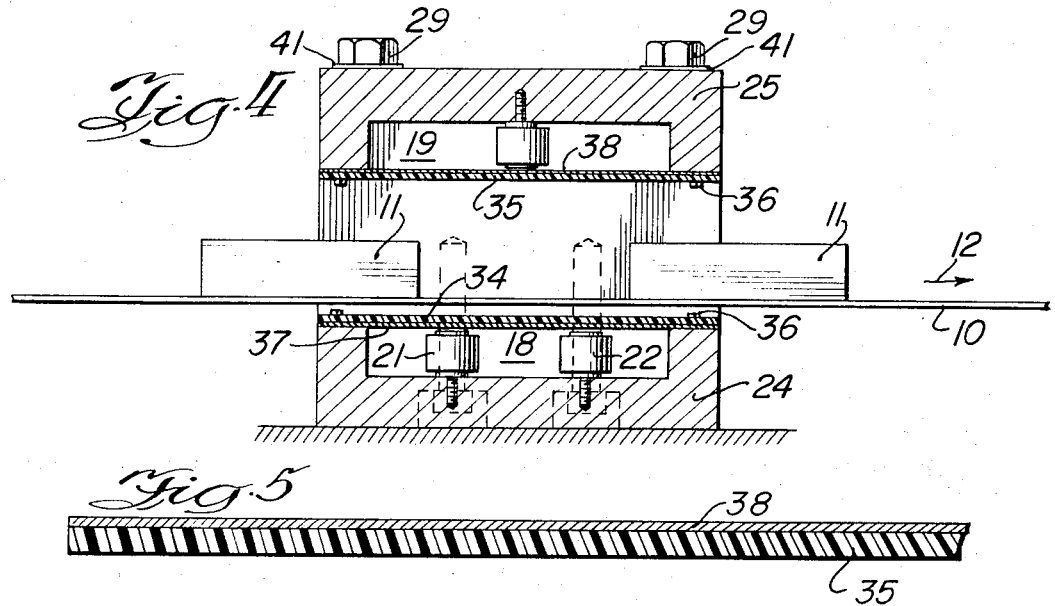
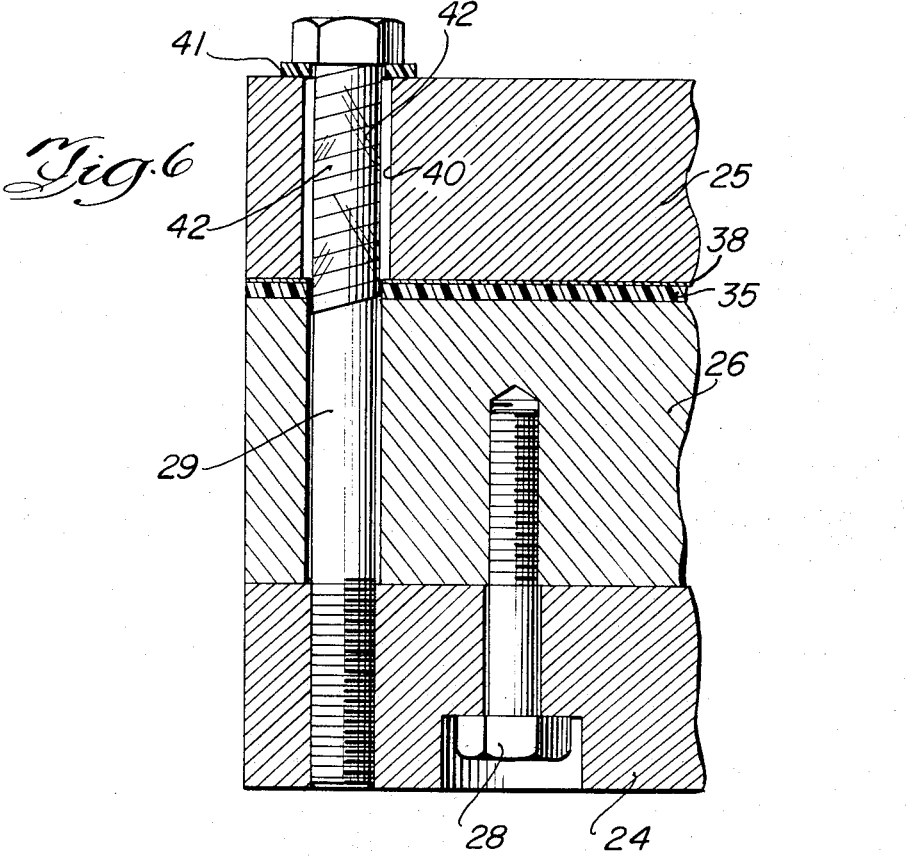

United States Patent Office 3,361,962
Patented Jan. 2, 1968

3,361,962
METAL DETECTOR WITH ADJUSTABLE FRAME ASSEMBLY
Lyndon J. Albrecht, Milwaukee, Wis., assignor to Indiana General Corporation, a corporation of Indiana
Continuation of application Ser. No. 433,663, Feb. 18, 1965. This application Dec. 19, 1966, Ser. No. 603,050
2 Claims. (Cl. 324—41)

ABSTRACT OF THE DISCLOSURE

A tramp metal detector for a wide conveyor, having a generator coil assembly below the conveyor and a detector coil assembly above the conveyor. One of the two assemblies has two portions spaced apart along the conveyor and on either side of the single portion of the other assembly, and connected in phase opposition for a null output. Each coil portion is formed of a plurality of individual coils separately mounted on studs extending from frame members. The upper frame member is adjustable to balance the system. The frame members are of conductive material with the coils mounted in recesses in the opposed faces, the recesses being covered by insulating panels with conductive shield layers thereon.

---

This is a continuation of application Ser. No. 433,663, filed Feb. 18, 1965.

This invention relates to a metal detector and more particularly to an improved coil detector assembly and support therefor.

It has been known to sense the presence of a conductive or metallic object, in a nonconducting medium, by an apparatus including a generator which establishes a sensing field which is disrupted or modified by a passage of the conductive material therethrough. The apparatus includes a detector which responds to the disruption establishing an electrical signal which indicates the metal presence. See, for example, Clapp Patent 2,869,074, dated Jan. 13, 1959.

Prior apparatus in this field has been subject to many problems and instabilities rendering it extremely sensitive to changes in ambient conditions, vibration, proximity of a conductive mass to the sensing coil and the like.

A principal object of this invention is the provision of a balanced coil assembly which enhances the sensitivity of the system to metal and reduces the instability of the equipment as a result of outside influences.

One feature of the invention is the provision of a metal detector having a signal generator, a detector and balanced coil means connected with the generator and with the detector and establishing a sensing field adjacent thereto, providing substantially a null input to the detector in the absence of metal to be sensed and having an input to the detector in the presence of metal within the field. More specifically, the balanced coil means includes a generator coil assembly and detector coil assembly, one having two spaced portions connected in phase opposition and the other a single portion aligned with an extension of the effective center line of the two portions.

Another feature is that means are provided for balancing the signal in the detector coil, and more particularly that this balancing means includes a movable support for one of the coil assemblies which allows proper alignment of the two coil assemblies.

A further feature is that each of the coil portions is made up of a plurality of coil elements, or individual coils, which are generally aligned in planes at right angles to the spacing between the two coil portions. These individual coils may be connected in various series and parallel circuit combinations to establish the inductance and resistance necessary for proper operation of the generator and detector circuits.

Yet another feature is that relative movement is affected between the medium containing the conductive items to be detected and the coil assembly, with the two portions of the one coil assembly spaced generally in the direction of movement of the medium and with one coil assembly on one side of the path of movement and the other coil assembly on the other side thereof.

Still a further feature is the provision of a supporting frame of conductive material for the coil assemblies, the frame shielding the coil assemblies and providing an aperture in which the sensing field is established and through which the material to be inspected passes. Preferably, the frame includes two oppositely disposed spaced members having recessed surfaces with the coil assemblies mounted in the recesses and a protective cover, including a layer of conductive material, over the coil recesses.

Further features and advantages of the invention will readily be apparent from the following specification and from the drawings, in which:

FIGURE 1 is a perspective view of an apparatus embodying the invention;

FIGURE 2 is a diagrammatic illustration of the generator, detector and coil assembly;

FIGURE 3 is a vertical section through the coil support frame at right angle to the path of movement of the medium;

FIGURE 4 is a section taken generally along line 4—4 of FIGURE 3;

FIGURE 5 is an enlarged fragmentary section of a portion of a coil cover; and

FIGURE 6 is an enlarged fragmentary section through one end of the frame.

The apparatus disclosed herein may be utilized as a general purpose metal detector, to indicate the presence of conductive material within the sensing field. An important use for such an apparatus is in the detection of unwanted or tramp metal in raw materials, finished products as foodstuffs, or the like. More specifically, the generally nonconductive medium to be checked may be moved in a bulk form by a conveyor belt through the sensing field. The term "medium" is used herein to designate the material in which the undesired metal may be found whether the material is in loose or bulk form or finished products. The action of the sensing apparatus in detecting the conductive material is exactly the same.

Prior apparatus used for detecting metal in this manner has been subject to instabilities as a result of variations in the ambient conditions as temperature and humidity. Furthermore, such apparatus has been sensitive to physical disturbance as vibration which causes movement of the sensing coils and may result in an undesired indication of the presence of metal. Another problem of the prior apparatus has been with the movement of a mass of metal in the vicinity of the sensing head. It sometimes occurred that the apparatus would be actuated by machinery operating near the sensing area or even a workman walking past with a conductive tool in his pocket. Of course, one solution to some of these instability problems was to reduce the sensitivity of the apparatus. Then, however, small particles of conductive material, which may be objectionable, would not be detected.

The apparatus disclosed and claimed herein provides high sensitivity, ie., permits detection of small particles, while minimizing the dependence of the apparatus on ambient conditions, vibration, or movement of conductors in the vicinity.

In FIGURE 1 of the drawings, a conveyor 10 carries packaged articles 11 in the direction indicated by arrow 12. The packages 11 contain generally nonconductive material as foodstuffs, for example, which it is desired to check for the presence of conductive material, as metallic particles. While the material being checked is illustrated in the drawings as a series of packages, the apparatus is equally adapted for use in checking bulk material or the like, for example.

Conveyor 10 moves the material being checked through the aperture 14 of a generally rectangular frame 15 which carries electrical coil assemblies that are connected with a signal generator and a detector. Frame 15 is in turn mounted on a suitable base 16 which is preferably so associated with the conveyor 10 that there is only longitudinal movement of the conveyor with respect to the frame.

The circuit for the detection system is illustrated in block form in FIGURE 2. A generator 17, which may provide sine wave at suitable frequency, as 50 kilocycles, has an output connected with the input of a generator coil assembly 18. A detector coil assembly 19 has an output connected with the input of a detector 20. The two coil assemblies considered together form a balanced coil means which generates a sensing field that has a balanced condition with respect to the detector in the absence of a conductive particle, but which becomes unbalanced establishing an electrical signal in the detector coil assembly as a conductive particle passes through. The generator coil assembly 18 has two coil portions 21 and 22 which are driven by signals 180° out of phase, from generator 17. The two coil portions 21 and 22 are preferably spaced from each other in the direction of movement of conveyor 10. The single coil portion of coil assembly 19 is preferably located in plane halfway between the two portions 21 and 22 of the generator coil assembly. As will appear, the generator and detector coil assemblies 18 and 19 may be moved relative to each other to achieve a substantially balanced condition, i.e., one in which only a small voltage is induced in the detector coil assembly. When a conductive particle passes through the sensing field between the two coil assemblies, it disrupts the balanced condition, generating a substantial signal in the input of detector 20. The output of the detector may be utilized to sound an alarm, to eject a faulty article 11 from the conveyor, or to perform some other desired action as a result of the sensing of the conductive material. Many such systems are well known and form no part of the present invention.

The construction of frame 15 and the mounting of coil assemblies 18 and 19 will now be described in detail with particular reference to FIGURES 3 and 4. Frame 15 is of a conductive material, as aluminum, and includes a lower frame member 24 and an upper frame member 25 which in the illustrated embodiment of the invention form the longer sides of a rectangle. The ends of the rectangle are closed by vertical spacer members 26 and 27 which are secured to the lower frame member by machine screws 28. Upper frame member 25 is secured directly to the lower frame member 24 by machine screws 29 which extend through the spacers 26 and 27. Lower frame member 24 has end portions 24a extending beyond the frame to which machine screws 30 extend, securing the frame to base 16.

The inner surfaces of frame members 24 and 25 are recessed, at 31 and 32, providing a space within which the coil assemblies 18 and 19 are physically mounted. Each of the coil portions is made up of a plurality of individual coils or coil elements 33 mounted on studs 33a in spaced relation but aligned in planes generally at right angles to the spacing between the two coil portions 21 and 22, and thus at right angles to the path of movement of the conveyor through aperture 14. This provides a more uniform sensing field throughout the sensing area than could readily be obtained with a single coil.

The coil elements may electrically be connected in series, in parallel or in any combination thereof to provide the desired combination of inductance and resistance to operate properly with the circuits of generator 17 and detector 20. In a specific embodiment of the invention, the individual coil elements have an inductance of 80 millihenrys. Two coils connected in parallel have a net inductance of 40 millihenrys while two coils connected in series have a total inductance of 160 millihenrys. The various combinations may be used to establish the desired circuit conditions, field configuration, field strength and sensitivity. Connections are made to the coils through electrical conductors that extend through passages in the frame members to cable connectors (not shown).

The recessed center sections of the lower and upper frame members 24 and 25 are covered by protective panels 34 and 35, secured to the edges of the frame members as by screws 36. Cover panels 34 and 35 are preferably of a relatively strong, corrosion resistant material, as a plastic impregnated fabric material. Laminated to the inner surface of each of the cover members is a sheet 37, 38 of conductive material, as aluminum foil. The aluminum foil must be applied with care so that no wrinkles are formed. More particularly, an adhesive coated foil material may be used. The foil completes the conductive enclosure for the coils themselves.

The heavy frame 15 of conductive material provides both mechanical stability for the coil assemblies and forms an electromagnetic shield around aperture 14 which serves to confine the sensing field to the area within the aperture. If little or no energy from generator coil assembly 18 exists outside the aperture, the sensing system will not respond to the presence or movement of conductive objects in the vicinity. Furthermore, by utilizing a relatively rigid support for the individual coil elements, problems of vibration are minimized.

It is important that the system be adjustable to establish a balanced condition at the input of the detector. In the illustrated embodiment of the invention, this is accomplished by mounting the upper frame member 25 which carries the single portion of the detector coil assembly 19, for movement with respect to frame member 24 and coil assembly 18. More specifically, the machine screws 29 which secure upper frame plate 25 to the rest of the structure, are appreciably smaller in diameter than the holes 40 through the plate, FIGURE 6. These machine screws may be loosened and upper plate 25 moved to the proper position for a desired null or optimum output signal. This final adjustment can be accomplished on a trial and error basis.

Upper plate 25 is insulated from the remainder of the frame to prevent establishment of a closed conductive loop. Cover 35 separates the upper plate from spacers 26. A fiber washer 41 under the head of each screw 29 together with a layer of insulating tape 42 on the shank of each screw prevents completion of a circuit through the screws.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a detector for metal moving along a path, having an AC signal generator with an output, a detector with an input, and balanced coil means including a generator coil assembly connected with the generator output and a detector coil assembly connected with the detector input, one of the assemblies having two coil portions spaced apart in a direction along said path and the other having a single coil portion, the two spaced portions being electrically connected in phase opposition, the improvement which comprises: a plurality of individual coils forming each of said coil portions, each portion having an equal number of coils, the plurality of coils of each coil portion being generally aligned in a plane at right angles to the spacing between the spaced portions, said coil assemblies having a uniform sensing field therebetween across said path and providing substantially a null input signal to the detector in the absence of metal to be sensed in the sensing field and providing an input to be detected on movement of metal through said field; and frame members on which said coil assemblies are mounted, one frame member being mounted with respect to the other by means of threaded fasteners which extend through holes in said one member, said holes being larger than said fasteners to permit relative movement of said members in a direction parallel with the plane of said path.

2. In a detector for metal moving along a path, having an AC signal generator with an output, a detector with an input, and balanced coil means including a generator coil assembly connected with the generator output and a detector coil assembly connected with the detector input, one of the assemblies having two coil portions spaced apart in a direction along said path and the other having a single coil portion, the two spaced portions being electrically connected in phase opposition, the improvement which comprises: a plurality of individual coils forming each of said coil portions, each portion having an equal number of coils, the plurality of coils of each coil portion being generally aligned in a plane at right angles to the spacing between the spaced portions, said coil assemblies having a uniform sensing field therebetween across said path and providing substantially a null input signal to the detector in the absence of metal to be sensed in the sensing field and providing an input to be detected on movement of metal through said field; four frame members of conductive nonmagnetic material arranged generally in a rectangle with the coils carried by two oppositely disposed members, the other two oppositely disposed members spacing the first two members apart, the facing surfaces of the two members on which the coils are mounted being recessed to receive said coils; a plurality of parallel studs secured within the recesses of each member and extending toward the other member with the studs aligned in rows and having the coils of each coil assembly portion mounted on the studs of one row; covers of insulating material for said recesses; and a conductive coating on the inner surface of each of said covers.

References Cited

UNITED STATES PATENTS

| | | | |
|---|---|---|---|
| 2,237,254 | 4/1941 | Broekhuysen | 324—37 |
| 2,513,745 | 7/1950 | Reynolds | 324—41 |
| 2,550,688 | 5/1951 | Gossick | 324—41 |
| 2,598,252 | 5/1952 | Gossick | 324—41 |
| 3,061,775 | 10/1962 | Reznowski | 324—41 |

RUDOLPH V. ROLINEC, *Primary Examiner.*

WALTER L. CARLSON, *Examiner.*

R. J. CORCORAN, *Assistant Examiner.*